FIG. I

INVENTOR
RONALD ARTHUR WILSON

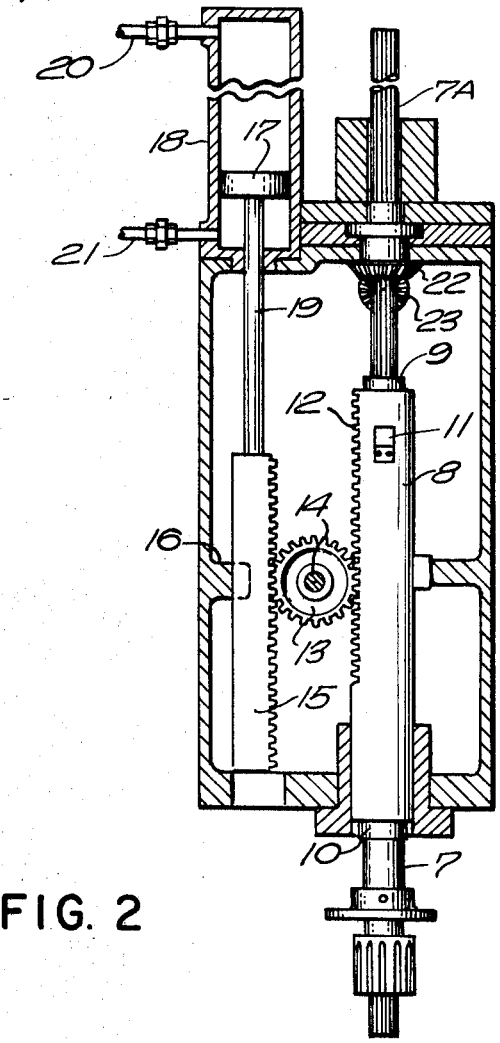
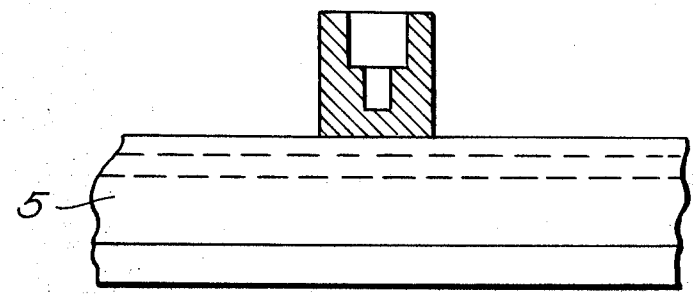
FIG. 2
INVENTOR
RONALD ARTHUR WILSON
BY
*Louis Orenbuch*
ATTORNEY June 23, 1970 R. A. WILSON 3,516,327
AUTOMATIC FEED AND DEPTH CONTROLLER
Filed Sept. 24, 1968 5 Sheets-Sheet 3

INVENTOR.
RONALD ARTHUR WILSON
BY
*Louis Orenbuch*
ATTORNEY

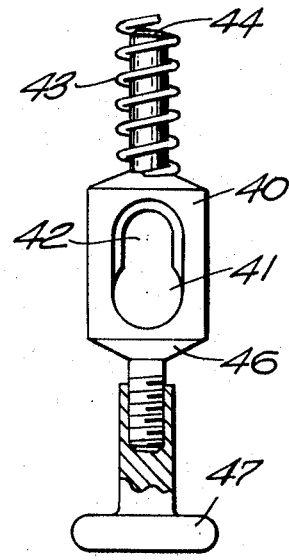
FIG. 6
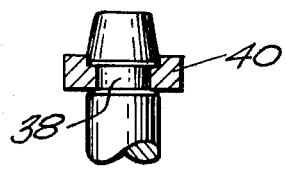
FIG. 7
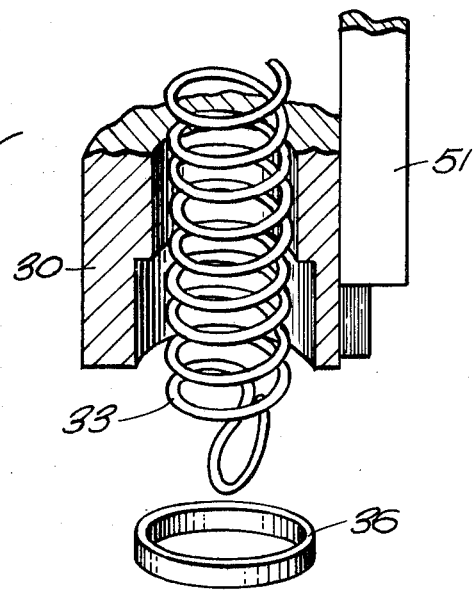
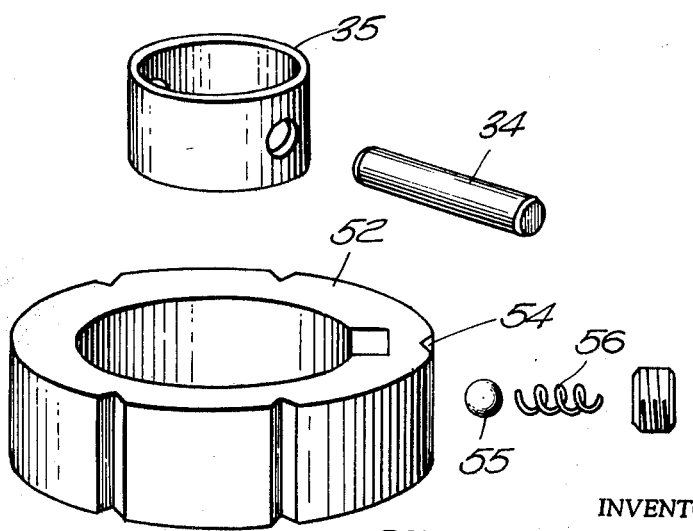
FIG. 8

INVENTOR.
RONALD ARTHUR WILSON
BY
Louis Orenbuch
ATTORNEY great# United States Patent Office 3,516,327
Patented June 23, 1970

3,516,327
AUTOMATIC FEED AND DEPTH CONTROLLER
Ronald Arthur Wilson, West Medway, Mass., assignor to Microwave Development Laboratories, Inc., a corporation of Massachusetts
Filed Sept. 24, 1968, Ser. No. 762,031
Int. Cl. B23c 7/00; B23b 47/18; B23q 5/20
U.S. Cl. 90—11                     5 Claims

ABSTRACT OF THE DISCLOSURE

An attachment has a frame that is rigidly attached to a machine tool of the type having a movable lug indicating the position of the spindle. The frame carries an axially sliding hollow shaft which can be moved downwardly against the force of a spring. A detenting mechanism holds the shaft in one of a number of angularly spaced stations. Secured to the shaft is a turret carrying adjustable bolts. A different bolt is positioned in the path of the lug at each different station. Switches are arranged to sense the axial positions of the shaft and a stop is secured on the frame to intercept the bolt and halt further movement of the spindle. The shaft and turret are arranged to facilitate the easy removal of the turret.

SUMMARY OF THE INVENTION

Figure 1:
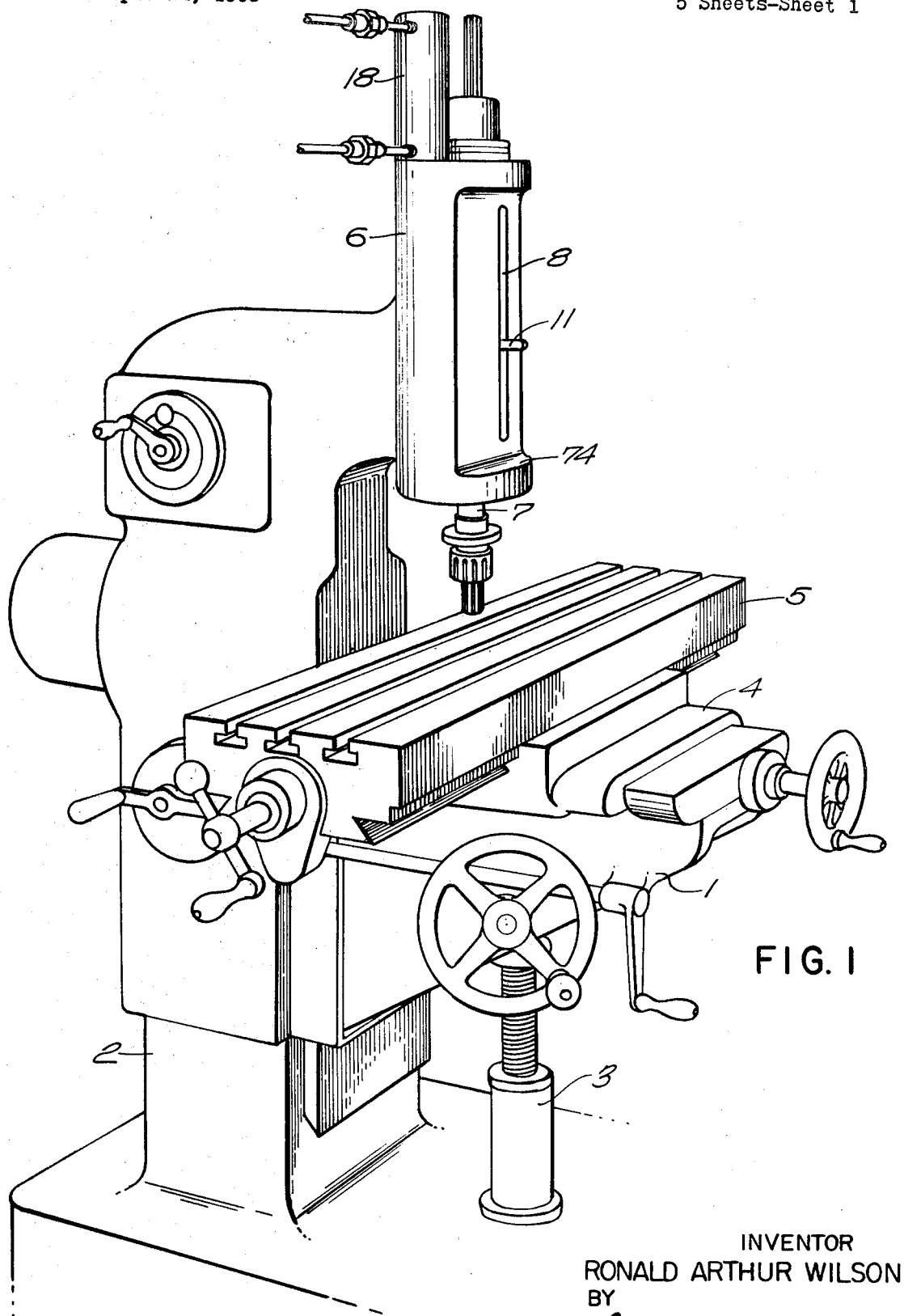

This invention pertains to an attachment for use with boring, drilling, milling, reaming or other machine tools where the advance of the tool toward the work is normally manually controlled. More particualrly, the invention concerns a device that is readily attached to the machine and automatically controls the advance of the spindle toward the work, the depth of penetration of the tool, and withdrawal of the tool to a position from which another operation can be commenced.

DISCUSSION OF THE PRIOR ART

In machining operations it is often required to bore to a precise depth and the same work piece may require bores having different depths. Further, to facilitate machining, it is desirable to rapidly feed the cutting tool toward the work and to change to a lower rate of feed just before the tool contacts the work piece.

Automatic feed and depth control devices have been made as integral parts of some machine tools and in recent years computers have been used to control the feed, boring depth, and other functions of machine tools. Such devices and computers are expensive and complex. There is a need for a simple and inexpensive device that can easily be attached to a machine and provide feed and depth control for the machine.

Conventional automatic feed and depth control devices usually are capable of rapidly feeding the cutting tool to a single datum plane. Where cutting operations commence at different planes, the machining process is slowed because for some operations the datum plane is considerably above the level where cutting actually commences and time is consumed in the unnecessary slow advance of the tool toward the work.

OBJECTIVES OF THE INVENTION

For efficient machining practice, it is desirable to rapidly advance the tool to the point where cutting is to commence and to then shift to the rate of feed appropriate for the advance of the tool while it is cutting into the work. It is desirable, therefore, to have an automatic feed and depth control device which permits a change in the rate of feed at a different level for each cutting operation. It is also desirable to be able to store the feed and depth control information as set up on the control device so that the work can be easily duplicated at a later time.

The principal objective of the invention is to provide an attachment which controls the depth of the cutting tool on an automatically driven machine and which permits the rate of feed to be set at a different level for each machining operation.

It is a further objective of the invention to provide an automatic feed and depth control attachment having a removable turret whereby the set up can be easily removed from the attachment and stored for later use.

THE INVENTION

The invention resides in an attachment comprising a frame adapted to be rigidly secured to a machine tool having a position indicating lug attached to its spindle. Mounted on the frame is an axially sliding hollow shaft which can be moved downwardly against the force of a spring. A detenting mechanism is arranged to hold the shaft in any one of a number of angularly spaced stations. Attached to the shaft is a turret carrying adjustable bolts. The turret is arranged to rotate with the shaft to position a different bolt in the path of the lug for each station. Switches are arranged to sense the axial position of the shaft and a stop is secured on the frame to intercept the bolt and halt further movement of the spindle. The shaft and turret are arranged to permit easy removal from the frame.

THE DRAWINGS

The invention, both as to its construction and mode of operation, can be better understood from the following exposition when it is considered in conjunction with the accompanying drawings in which:

FIG. 1 depicts a vertical plain milling machine of the conventional column and knee type.

Figure 4:
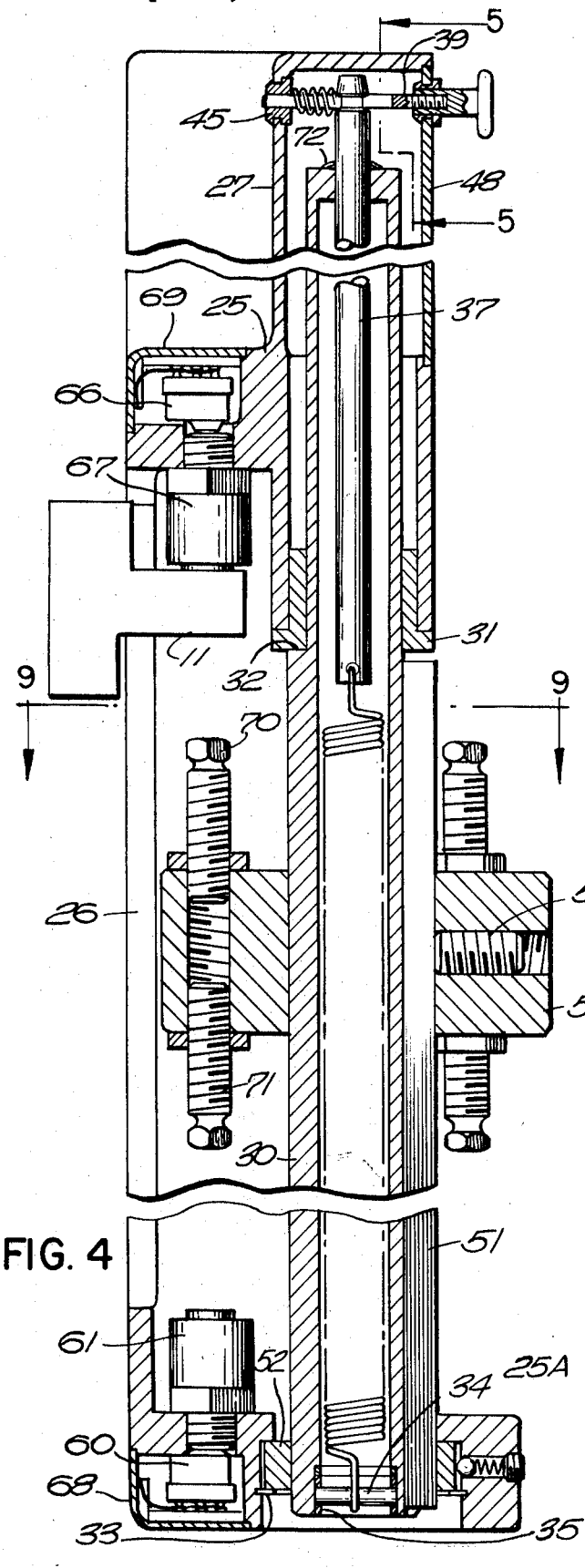
Figure 5:
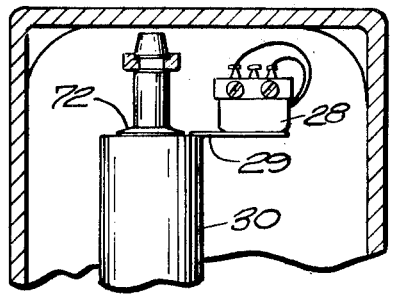
Figure 3:
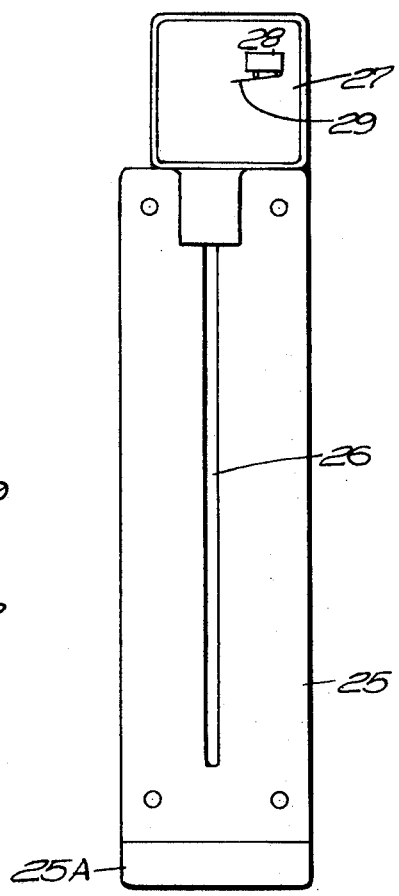
Figure 9:
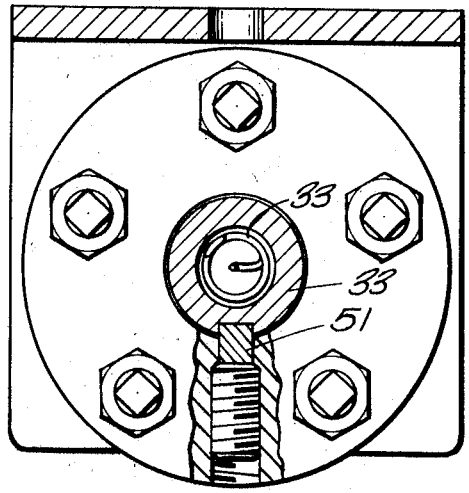
Figure 10:
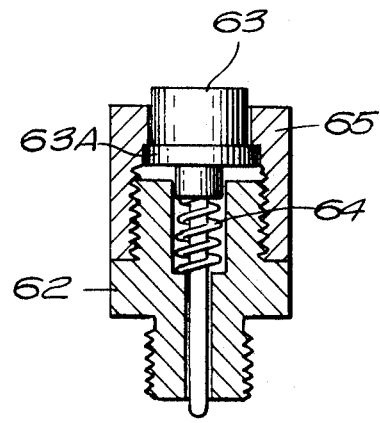
Figure 11:
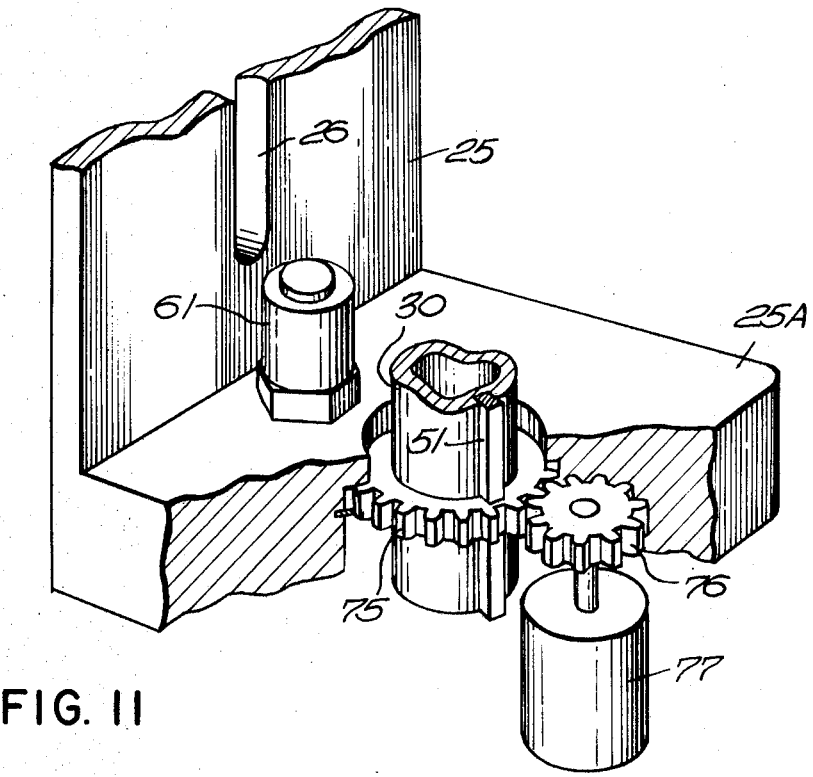

FIG. 2 is a sectional view of the machine's head showing the arrangement for driving the spindle, FIG. 3 is a front view of the frame employed in the preferred embodiment of the invention, FIG. 4 is a sectional elevational view showing the preferred embodiment of the invention, FIG. 5 is a view taken along the plane 5—5 in FIG. 4 and shows the arrangement of a switch housed in the frame, FIG. 6 is a top view of the keeper employed in the invention, FIG. 7 shows the keeper in engagement with a rod, FIG. 8 is an exploded view showing the mechanism at the lower end of the frame, FIG. 9 is a sectional view taken along plane 9—9 in FIG. 4 with part of the turret broken away to show the set screw bearing against the key, FIG. 10 is a sectional view showing details of the stop member, and FIG. 11 depicts an arrangement for automatically turning the shaft to another station.

THE EXPOSITION

Referring now to FIG. 1, there is shown a simplified vertical plain miling machine of the column and knee type having a knee 1 that can be raised or lowered on the column 2 by adjustment of a differential screw 3. A saddle 4 is movable on the knee and a table 5, which carries the work, can be moved horizontally at right angles to the movement of the saddle. In the plain milling machine, the work piece has translation in two orthogonal horizontal directions and in one vertical direction. In the universal milling machine, the work piece, in addition to the translatory motions permitted by the plain miller, can be given an additional motion of rotation about a vertical axis because the table is mounted to rotate relative to the saddle. The head 6 of the vertical milling machine protrudes from the column and carries a rotary spindle 7. The face of the head is usually flat and has in it a vertical slot 8.

FIG. 2 represents the mechanism in the head of a milling machine. The spindle 7 extends through a sleeve 8 which is confined between collars 9 and 10 fixed to the spindle. The sleeve is disposed in the head so that the sleeve can be moved vertically but cannot turn. Secured to the sleeve is a lug 11 which extends through the vertical slot 8 in the flat face of the head. The sleeve has teeth 12 which are engaged by a gear 13 mounted to turn upon a shaft 14 fixed in the head. The gear 13 is held in engagement with the teeth of a rack 15 by a guide block 16. The arrangement is such that movement of the rack causes the gear 13 to rotate in one direction or the other so as to move the sleeve and the spindle toward or away from the work.

The rack 15 is actuated by a hydraulic mechanism having a piston 17 disposed within a cylinder 18 that is fixed to the head. Extending through one end of the cylinder is a piston rod 19 which connects the piston 17 to the rack 15. The opposite ends of the cylinder are connected by pipes 20 and 21 to a source of hydraulic pressure. By controlling the application of hydraulic pressure to one end of the cylinder while furnishing a venting path for the fluid forced out of the other end of the cylinder, the piston can be displaced up or down within the cylinder. The rate of movement of the piston can be controlled by employing a variable displacement pump to regulate the flow of hydraulic fluid into the cylinder or metering devices can be employed to control the flow of hydraulic fluid into and out of the cylinder. As is usual with such hydraulic systems, a pressure relief valve or by pass valve is provided in the system to limit the pressure that can be built up within the system in the event that the spindle or sleeve movement is halted by an obstruction.

The spindle 7 is driven by a bevel gear 22 in mesh with another bevel gear 23 that is driven from an appropriate source of power. It is usual to arrange the drive to permit the speed of rotation of the spindle to be changed. Thus, the power source may be a variable speed motor or it may include a variable speed transmission. The upper portion 7A of the spindle is keyed or splined to bevel gear 22 in a manner which permits the spindle to move vertically with respect to that gear without disturbing the torque applied by the gear to the spindle.

The preferred embodiment of the feed and depth controller employs a frame 25, shown in FIG. 3, having in it a vertical slot 26. The frame is mounted on the flat face of the milling machine head to permit the lug 11 to protrude through the vertical slot 26. The frame, at its upper end, forms a housing 27 in which, as shown in FIG. 5, is secured a switch 28 having an arm 29 disposed to be actuated by a shaft 30 when the shaft is in its fully retracted position. The shaft 30, shown in FIG. 4, is journaled in a bearing 31 which allows the shaft to slide vertically and also permits the shaft to rotate. Shaft 30 is a hollow tube whose upper portion is of reduced diameter to provide a shoulder 32. The shafts uppermost position is limited by the abutment of shoulder 32 against the lower surface of bearing 31. Within shaft 30 is situated a helical spring 33 which is fastened at its lower end to pin 34. The pin extends diametrically across a ring 34 that rides upon the bearing 36. The upper end of the helical spring is fastened to a cylindrical rod 37. The rod 37 extends through an aperture in the upper end of shaft 30 and the rod, at its upper end, has a groove 38 that is engaged by a keeper 39.

Keeper 39, depicted in FIG. 6, has a flat body 40 in which there is a circular opening 41 through which the head of rod 37 can pass. The circular opening communicates with a central slot 42 providing ways which ride in the groove 38, as depicted in FIG. 7, when the keeper is engaged with the rod. A spring 43, shown in FIGS. 4 and 6, urges the keeper in the direction which maintains the engagement with rod 37. To release the rod, the keeper is pushed forward, against the force of spring 43, and the head of the rod then drops through the circular opening 41. The keeper has a cylindrical end 44 which is journaled in the bushing 45 and its other end 46 is threaded to mate with a knob 47. The plate 48, which covers the housing, has in it a bushing 49 which supports the keeper.

Shaft 30 has a keyway 50 which receives a key 51 that extends along the shaft for a substantial part of the shafts length. The lower end of the shaft, as depicted in FIG. 8, is keyed, by member 51, to a detent collar 52 which is journaled in a forwardly protruding part 25A of the frame. The detent collar is held in the frame by a retaining ring 53 (FIG. 4) seated in a groove in the frame. The detent collar rotates with shaft 30 while permitting the shaft to move vertically. The periphery of the collar is provided with grooves 54 disposed to be engaged by a ball 55 which is urged against the collar by a spring 56. The ball and collar grooves form a detent mechanism that inhibits rotation of the shaft when the ball is seated in one of the grooves. When sufficient torque is applied to shaft 30, the ball is unseated and the shaft then easily turns to the position where the next groove is engaged by the ball. The grooves thus determine the rotary positions in which the shaft is held by the detenting action of the ball.

Keyed to shaft 30 is an annular, course adjustment turret 58 which carries a set screw 59 that can be tightened against the key 51 to fix the position of the turret upon the shaft. When the screw is loosened, the turret can be slid along the shaft and its key to a new location. The course adjustment turret shown in FIG. 9 carries fine adjustment members distributed around the turret in locations related to the detented positions of the shaft. Each fine adjustment member is here represented by a bolt threaded into the turret and held in position by a locking nut. In a more sophisticated embodiment, the fine adjustment members may be in the form of micrometers.

A lower limit switch 60 (FIG. 4) is disposed on the frame 25 below a positive stop member 61. The stop member is shown in detail in FIG. 10 and is constructed of a cylindrical body 62 in which there is a central aperture that receives a plunger 63. A spring 64 urges the plunger to an upper position that is limited by the engagement of the flange 63A with a shell 65 threaded onto the body. The body is threaded into the frame and when the plunger is depressed, the limit switch 60 is actuated.

In a similar manner, an upper limit switch 66 is disposed on the frame directly over an inverted positive stop member 67. To protect the limit switches 60 and 66, housings are provided in the frame which are closed by cover plates 68 and 69. The electrical leads to the limit switches are brought out of the housings and connected to suitably control the operation of the machine tool.

In the uppermost position of spindle 7 (FIG. 2), the lug 11 bears upon the stop 67 (FIG. 4) and causes its plunger to actuate the upper limit switch 66. That limit switch may, for example, control the downward feed of the spindle and cause the spindle to be rapidly lowered. Limit switch 66 may also control movement of the table 5 (FIG. 1) and cause the work to be moved to a different position each time the upper limit switch is actuated by the plunger of stop 67. Downward feed of the spindle causes the lug 11 to move downwardly and engage the head of bolt 70. Thereafter, further downward movement of the lug 11 is accompanied by downward movement of the turret and shaft 30. The initial downward movement of shaft 30 causes actuation of switch 28 (FIG. 5) and the signal from that switch may, for example, cause a slower rate of downward feed of the spindle. Upon the lower limit fine adjustment bolt 71 engaging the stop 61, further downward movement of the spindle is prevented and lower limit switch 60 is actuated by the plunger of the stop member. The signal from switch 60 may be employed to cause the spindle to be withdrawn from the work and returned to its original position where the lug 11 actuates the upper limit switch. As the lug 11 moves upwardly, spring 33 causes shaft 30 to follow the upward movement of the lug until the further upward movement of the shaft is prevented by the abutment of shoulder 32 against bearing 31.

Before the spindle is again fed downwardly, the shaft 30 can be manually turned to its next detented position to bring a different pair of fine adjustment members on the turret into position directly beneath the lug 11. Thus, for each detented station of the shaft, a different lower limit fine adjustment can be set for the spindle.

In essence, the switches 28, 60 and 66 sense the vertical position of the spindle and provide signals that can be employed in various ways to control the rate of feed, the rate of rotation of the spindle (viz, the cutting speed), the movement of the table, and other functions of the machine on which the attachment is mounted.

FIG. 11 shows a modification of the attachment in which the collar 52 is replaced by a gear 75 keyed to shaft 30 in a manner permitting the shaft to slide axially through the gear. The gear is in engagement with a pinion 76 mounted on the shaft of an electric motor 77 secured to the frame 25. Preferably, the electric motor is provided with a brake that holds the motor "on station" and inhibits rotation until the motor is energized by an electrical signal. The brake, in effect, is the equivalent of the detent arrangement shown in FIG. 8 which holds the shaft in a station. The motor is arranged to turn the shaft 30 through a predetermined angle to a succeeding station each time the motor is actuated to bring a different pair of fine adjustment members on the turret into position directly beneath lug 11.

For easy storage of the set-up, the turret is readily removed from the attachment by loosening the set screw 59 and pressing the keeper 39 to release its engagement with the rod 37. To prevent the rod 37 from being completely drawn into the hollow shaft when disengaged from the keeper 39, a retaining ring 72 is fixed to the rod 37. Upon release, the shaft 36 drops down, permitting the turret to be removed. Another turret may then be placed upon the shaft and the shaft reinserted in the frame to engage the keeper 39 with rod 37.

Normally, in the use of the attachment, the upper fine adjustment bolts are employed to determine the position at which the rate of feed is changed from a fast downward feed to a feed rate appropriate to the machining operation to be performed. At each station of shaft 30, a different upper fine adjustment bolt is positioned in the path of lug 11 so that the point at which the rate of feed is changed can be different for each station.

The stops 61 and 67 are mounted on the frame and are intended to provide a positive means of limiting the vertical movement of the spindle. The lug 11 may, therefore, bring heavy pressure upon the stop members. It is desirable to keep the moment arm of the force exerted upon the stops as short as possible and those members are, consequently, mounted close to the vertical part of the frame. For accurately controlling the depth, the frame must be rigidly mounted on the machine tool. It is advisable to form a shelf, as indicated by the ledge 74 in FIG. 1, upon which the frame can rest when the attachment is secured to the machine tool, if the attachment is secured to the machine tool by bolts or other fastening means which permit an apppreciable amount of "play."

It is obvious that the invention may be embodied in different forms and that changes which do not depart from the essential nature of the invention can be made in the illustrated embodiment. It is intended therefore that this exposition be illustrative only of the preferred embodiment of the invention and that the patent be construed to embrace those structures which, in essence, utilize the invention defined in the appended claims.

What is claimed is:

1. An attachment for use with a machine tool of the type having a movable lug indicating the position of the machine's spindle, the attachment comprising,
    a rigid frame adapted to be fixed to the machine tool and receive the movable lug,
    a lower stop member fixed to the frame,
    an axially movable shaft journalled in the frame,
    resilient means connecting the shaft to the frame whereby the shaft is biased to a retracted position,
    a first switch on the frame arranged to sense the shaft when it it fully retracted,
    means on the frame for holding the shaft against rotation in any one of a plurality of angularly spaced stations,
    a turret mounted on the shaft in a manner permitting the turrent to be shifted axially relative to the shaft and fixed in position to rotate with the shaft,
    a plurality of fine adjustment members mounted on the turrent in positions related to the stations of the shaft, the fine adjustment members being arranged in pairs so that at each station one member of a pair is situated in the path of the movable lug and the other member of the pair is situated to be intercepted by the lower stop member, the fine adjustment members being individually adjustable on the turret to permit the lug to be intercepted at different points in its path and permitting the inerception by the lower stop member to occur at different axial positions of the shaft.

2. An attachment according to claim 1, further including
    a second switch arranged to be actuated when the movable lug contacts the lower stop member.

3. An attachment according to claim 2, wherein the resilient means includes a disengageable keeper for releasing the connection between the shaft and the frame.

4. An attachment according to claim 3, further comprising
    an upper stop member fixed to the frame and disposed in the path of the movable lug, and
    a third switch arranged to be actuated when the movable lug contacts the upper stop member.

5. An attachment according to claim 4, further including
    electrical means arranged, upon actuation, to rotate the shaft to its next successive station.

References Cited

UNITED STATES PATENTS

| 2,370,286 | 2/1945 | Berger. | |
| 2,909,082 | 10/1959 | Booth | 77—34.5 X |
| 3,435,730 | 4/1969 | Berberian | 77—34.5 X |

GIL WEIDENFELD, Primary Examiner

U.S. Cl. X.R.

29—65; 77—32.8, 34.5; 90—14